United States Patent [19]

Dave et al.

[11] Patent Number: 4,894,189
[45] Date of Patent: Jan. 16, 1990

[54] PROCESS FOR THE PRODUCTION OF SPHERICAL PARTICLES

[75] Inventors: Dilip Dave, Twickenham; Andrew Holt, Camberley; Timothy K. McNiff, Weybridge, all of England

[73] Assignee: The British Petroleum Company p.l.c., London, England

[21] Appl. No.: 187,483

[22] Filed: Apr. 28, 1988

[30] Foreign Application Priority Data

May 9, 1987 [GB] United Kingdom ............... 8711005

[51] Int. Cl.$^4$ ........................... B29B 9/08; B29B 9/16
[52] U.S. Cl. ................................... 264/15; 23/313 R; 264/117; 502/9; 502/10
[58] Field of Search .................. 264/15, 117; 502/9, 502/10; 23/313 R, 313 P

[56] References Cited

U.S. PATENT DOCUMENTS

| Re. 27,214 | 11/1971 | Nakahara | 264/15 |
|---|---|---|---|
| 2,952,644 | 9/1960 | Holden | 264/15 |
| 3,051,566 | 8/1962 | Schwartz | 264/15 |
| 3,429,958 | 2/1969 | Walcott | 264/117 |
| 3,574,654 | 4/1971 | Cowan et al. | 264/15 |
| 3,579,719 | 5/1971 | Moriya . | |
| 4,341,663 | 7/1982 | Derleth et al. | 264/15 |

FOREIGN PATENT DOCUMENTS

| 0025900 | 4/1981 | European Pat. Off. | 264/15 |
|---|---|---|---|
| 0211583 | 2/1987 | European Pat. Off. . | |
| 1667038 | 8/1966 | Fed. Rep. of Germany . | |

OTHER PUBLICATIONS

Chem Abstracts 107:46210z.

Primary Examiner—Jan H. Silbaugh
Assistant Examiner—Mary Lynn Fertig
Attorney, Agent, or Firm—Brooks Haidt Haffner & Delahunty

[57] ABSTRACT

A method for making spherical particles, which includes:

(a) kneading powdered raw material, preferably a refractory inorganic material, liquid and wax to form a dough/agglomerated granules, (b) separating, preferably by sieving, the dough/agglomerated granules to a predetermined size fraction without extruding, and (c) spheridizing the granules in a heated rotating bowl.

The method is particularly useful for the production of catalysts from refractory inorganic materials.

7 Claims, No Drawings

PROCESS FOR THE PRODUCTION OF SPHERICAL PARTICLES

This invention relates to the production of spherical particles and particularly to the production of particles suitable for use in fixed, moving or mobile beds.

Beds of particles kept in constant motion by an upwardly flowing stream of fluid are well known. If the particles are inert, the beds may be used for heat transfer and/or for carrying out thermal conversion of the fluid. If the particles contain catalytic components then catalytic reaction of the fluid occurs. Fixed beds are also well known.

The size of the particles depends on the type of bed and on the desired rate of fluid flow. Generally, for example, for fully fluidised beds the particulate diameter may range from 10–1000 microns (0.01–1 mm).

Spherical particles can be produced by a variety of techniques including the sol-gel method, pressing, agglomeration and spheridisation. The present invention is concerned with this last-mentioned technique. In it the powdered raw material for the particles is mixed with liquid and kneaded to give a plastic "dough", which is then extruded to give cylindrical particles. These cylindrical particles are fed to a rotating bowl where the cylinders undergo plastic deformation to spheres. By control of the amount of liquid used and hence the degree of plasticity of the extrudates and the speed of rotation of the bowl, spheridisation aims to convert extrudates with an aspect ratio of diameter to length of from 1:1 to 1:2 to spherical particles.

The main limitation in spheridisation of microspheres (less than 500 microns) is the extrusion step, since it is not practicable to form extrudates of less than 0.5 mm diameter. Consequently spheridisation cannot easily produce spherical particles below 0.5 mm diameter. The need to form extrudates also adds a step to the overall spheridisation process.

The present invention is based on the finding that granular particles can be spheridised.

According to the present invention, a method of making spherical particles, in particular spherical particles of less than 500 microns diameter, comprises:
(a) kneading powdered raw material, preferably a refractory inorganic material, liquid and wax to form a dough/agglomerated granules,
(b) separating, preferably by sieving, the dough/agglomerated granules to a predetermined size fraction without extruding, and
(c) spheridising the granules in a heated rotating bowl.

The method may be used to form spherical particles of any required diameter e.g. 10 microns–5 mm, but is particularly suitable for forming particles of 50–1000, especially 50–500, microns diameter, this range including the range where the spheridisation of extrudates is not practicable.

The direct spheridisation of granules tends to accentuate the problems of spheridisation, particularly the problems of preventing agglomeration of the particles in the bowl and fouling of the bowl. There must be sufficient liquid added to the powder to make the granules plastic and deformable, but the presence of the liquid tends to encourage agglomeration and fouling. It is not practicable to reduce the liquid content too far and, in any case, liquid tends to be released during the spheridisation. One known solution is to add a hygroscopic powder (e.g. alumina) to the particles in the bowl, but this can result in the production of less attrition resistant spheroids.

The present invention, therefore, includes two additional features to reduce agglomeration and fouling. One is the inclusion of a certain amount of wax in the dough. The second is the heating of the bowl for the spheridisation step.

The method of the present invention can be used to produce spherical particles from any of the materials known to be capable of spheridisation by the known extrudate-based spheridisation technique. It is, however, particularly suitable for the production of spherical particles suitable for use in fixed, moving or mobile beds.

For such use the raw material may be an inorganic material refractory enough to withstand the temperatures to which it may be subjected and hard enough to withstand the attrition that will result from the fluidisation or spouting. Generally, the material will be capable of withstanding temperatures of at least 350° C. It may be an inorganic oxide or mixture of oxides, for example an oxide of elements of Groups II, III or IV of the Periodic Table according to Mendeléef, e.g. alumina, silica, magnesia, titania or a mixture of such oxides. It may be a chemical combination of such oxides e.g. a silica-alumina clay. It may be a zeolite. Such oxides, clays and zeolites may be naturally-occurring or synthetically-produced. Other suitable raw materials include borides, nitrides, carbides and fluorides.

If the particles are required to have catalytic properties a very wide range of materials may be used depending on the reaction to be catalysed by the bed. The catalytic components may be added before the spheridisation process, e.g. added to the powdered raw material or added during the kneading step, or the spheridised particles may be subsequently impregnated with catalytic material.

The powdered raw material preferably has a small particle size of e.g. 1 to 100 microns.

The liquid to be added may be water, dilute mineral and/or organic acids (1–60% v/v), a solution of an alkali or alkaline earth compound, particularly the oxide, hydroxide or carbonate (1–60/w/v), in particular of potassium, or surfactants or binders which may be either organic or inorganic. The amount of total liquid added during kneading is suitably 5 to 65% v/w on powder. Wax addition can for example vary between 1 to 20% w/w, depending on the powder quality and the quantity of liquid used. Preferably the quantity of wax added is between 2 to 10% w/w.

The kneading step may follow conventional spheridisation practice, the powdered raw material and liquid being kneaded in a Z-blade mixer with the dough emerging as an agglomerated granular powder.

The agglomerated granular material may then be sieved out using standard sieve shaking equipment. The vibration assists in breaking the dough into granules and the sieve mesh should be chosen to allow granules of the required size to pass through it. Oversize particles may be taken off (e.g. through an opening at a suitable height above the mesh) and recycled to the kneader. A multi-deck sieve shaker may be used to pass the agglomerates/granules through two sieves in order to control more rigorously the particle size distribution of material placed in the spheridiser.

Granules of the required size which have passed through the sieve mesh may be fed directly to a spheridiser bowl. This may consist, in known manner, of a rotary base plate (the speed of rotation of which may be controlled, usually between 800 and 1400 rpm) and a non-rotating cylinder surrounding the rotating base plate. Centrifugal and gravitational forces throw the granules against the cylinder as a fluidised ring of particles, this action serving to deform the granules to a spherical shape. Spheridised particles may be taken off through an opening in the cylindrical wall at a convenient height above the base plate.

The spheridiser bowl may for example be heated to a temperature of from 25° to 100° C., preferably 30° to 45° C. The top of the spheridiser may be open to allow any liquid evaporated by the heating to escape.

The heating may be achieved in any convenient way. The base plate and bowl may be heated directly e.g. by electrical resistance elements supplied by wires through the base plate spindle, or indirectly by blowing a stream of hot gas against the underside of the plate. Alternatively a stream of hot gas may be directed into the spheridiser bowl. The bowl may be heated before and/or during the spheridisation step.

By careful control of the operating variables, particularly the amount of liquid and wax added and the temperature and speed of rotation of the spheridiser base plate it has been found possible to produce uniform shperical particles from granules without agglomeration or fouling and without the need for an extrudate-forming step.

The invention is illustrated by the following examples.

EXAMPLE 1

The following were weighed into the mixing chamber of a 'WINKWORTH' (Trade Mark) Z blade mixer:

| 'Kaiser Light' alumina substrate | 1600 g |
| --- | --- |
| Nickel oxide powder | 600 g |
| 10% v/v nitric acid (aq) | 1000 cc |

These were mixed for 10 minutes, then wax (BG 95/95) 100 g was added and thoroughly mixed into the dough. The dough was screened through a 1.7 mm sieve and the particles less than 1.7 mm were fed to the spheridiser bowl which had been heated by blowing hot air into it. The external wall of the bowl was at a temperature of about 30° C. The dough was spheridised using a medium coarseness spheridiser plate (2 mm) rotated at 1400 rpm for six minutes. No further heat was supplied to the bowl during this time. The product was highly spherical material in the range 50–1000 microns diameter. There was no fouling or build up of material on the spheridiser plate.

EXAMPLE 2

The following were weighed into the mixing chamber of a 'HOBART' (Trade Mark) dough mixer:

| 'Kaiser Light' alumina substrate | 1600 g |
| --- | --- |
| Nickel oxide powder | 480 g |
| 10% v/v formic acid (aq) | 1200 cc |
| Wax BG 95/95 | 120 g |

These were mixed for ten minutes. The dough was then transferred to a 'Winkworth' Z blade mixer to mix for a further five minutes.

The dough was screened through sieves of between 1.7 mm and 0.7 mm mesh. The small granules were spheridised as in Example 1. The larger lumps were recycled to the 'Winkworth' mixer. This recipe was used to produce over 200 liters of spherical material as described in Example 1.

EXAMPLE 3

The following were weighed into the mixing chamber of a 'HOBART' (Trade Mark) dough mixer:

| Pural SB alumina ex Condea Chemie (Boehmite (alpha-alumina monohydrate) | 2400 g |
| --- | --- |
| Nickel oxide powder | 600 g |
| 1% wt/wt poly vinyl acetate solution | 800 g |
| Wax (BG 95/95) | 108 g |
| 10% v/v formic acid (aq) | 550 cc |

These were mixed for ten minutes to form a dough which was then transferred to a 'Winkworth' Z blade mixer and mixed for a further five minutes. The dough was screened and spheridised as described in Example 1 to give a highly spherical product in the range 50–1000 microns.

EXAMPLE 4

The following were weighed into the mixing chamber of a 'WINKWORTH' Z blade mixer:

| 'Kaiser Light' alumina | 2.54 kg |
| --- | --- |
| Water (distilled) | 500 cc |
| Wax BG 95/95 | 100 g |

These components were mixed for 5 minutes prior to addition of 800 cc of 1.8 g/l KOH solution. The dough was further mixed for 5 minutes. 500 cc of distilled water was added and the dough mixed for a further 10 minutes. The dough was sieved through a 700 micron sieve and the fines spheronised in a bowl heated to 100° C., according to details in Example 1.

EXAMPLE 5

2.5 kgs of hydrated tin oxide were Z bladed with 30% v/v nitric acid (prepared by diluting concentrated acid 30 mls to 100 mls with water) until a stiff, plastic dough was obtained. To this was added 200 gms of magnesium, lithium, silicate known under the trade name of "Laponite". The mixture was blended for a further 30 mins and quantities of nitric acid were added to maintain plasticity. The dough was then blended with 180 gms of wax derived from a solvent dewaxed BG95/95 oil. The dough blend was then sieved through a 500 micron screen. The granules produced were then made into microspheres by rotating in a heated, revolving spheroniser.

The microspheres produced were then dried at 150° C. for 12 hrs and finally calcined at 350° C. for 4 hrs.

Microspheres in the range of 150–420 micron resulted.

COMPARATIVE TEST 1

The following were weighed into the chamber of a 'WINKWORTH' Z blade mixer.

| 'Kaiser Light' alumina substrate | 800 g |
| --- | --- |
| Nickel oxide powder | 600 g |

| | |
|---|---|
| 10% v/v nitric acid (aq) | 500 cc |

These were mixed for 10 minutes. The dough was allowed to dry for approximately 30 minutes. This was added to the spheridiser bowl. The dough was spheridised using a medium coarseness plate rotated at 1400 rpm for approximately 3 minutes. The dough spheridised initially but sticking of particles occurred which soon resulted in the build up of material into large aggregates and bad fouling of the plate.

This is not an example according to the present invention because no wax was added and the bowl/spheridiser was not heated. It is included only for the purpose of comparison.

COMPARATIVE TEST 2

The following were weighed into the chamber of a 'WINKWORTH' Z blade mixer:

| | |
|---|---|
| 'Kaiser Light' alumina substrate | 800 g |
| Nickel oxide powder | 300 g |
| 10% v/v nitric acid | 470 cc |
| 1% wt/wt Hydroxyethyl Cellulose solution (aq) | 120 cc |

These were mixed for ten minutes, then wax (BG 95/95) 50 g was added and thoroughly mixed into the dough. The dough was screened through a 1.7 mm sieve and the particles less than 1.7 mm were fed to the spheridiser bowl. The dough was spheridised using a medium coarseness plate (2 mm) rotated at 1400 rpm. Initially spherical particles were formed but these began to stick and agglomerate. After about 3 minutes operation the agglomeration and fouling became excessive.

This is not an example according to the present invention because the bowl/spheridiser was not heated. It is included only for the purpose of comparison.

We claim:

1. A method for making spherical particles having a diameter in the range from 10 to 1000 microns suitable for use in fixed, moving, or mobile catalyst beds, which comprise:
   (a) kneading powdered raw material selected from oxides, borides, nitrides, carbides and fluorides of aluminum, silicon, magnesium, titanium, mixtures thereof and chemical combination thereof, liquid in the amount of 5 to 65% v/w on powder, and wax in the amount of 2 to 10% w/w, to form a dough/agglomerated granules,
   (b) separating the dough/agglomerated granules to a predetermined size fraction without extruding, and
   (c) spheridizing the granules in a rotating bowl heated to a temperature of from 25° to 100° C.

2. A method as claimed in claim 1, in which the raw material is a refractory inorganic material.

3. A method as claimed in claim 2, in which the raw material is alumina.

4. A method as claimed in any one of claims 1 to 3, in which step (b) is carried out by sieving.

5. A method as claimed in any one of claims 1 to 3, in which the liquid is water, a dilute mineral and/or organic acid, a solution of an alkali or alkaline earth compound, a surfactant or a binder.

6. A method as claimed in claim 1 wherein the spherical particles have a diameter in the range from 50 to 500 microns.

7. A method as claimed in claim 1 wherein the raw material comprises an oxide or a mixture of oxides.

* * * * *